(12) United States Patent
Abe et al.

(10) Patent No.: US 6,307,675 B1
(45) Date of Patent: Oct. 23, 2001

(54) REAR-PROJECTION SCREEN FOR USE WITH A LIQUID CRYSTAL PANEL AS A VIDEO SOURCE

(75) Inventors: Takashi Abe; Tsutomu Yoshida; Yuichi Nishikawa; Yoshiyuki Ono, all of Tokyo (JP)

(73) Assignee: Toppan Printing Co. Ltd., Tokyo (JP)

(*) Notice: Subject to any disclaimer, the term of this patent is extended or adjusted under 35 U.S.C. 154(b) by 0 days.

(21) Appl. No.: 09/468,338

(22) Filed: Dec. 21, 1999

(30) Foreign Application Priority Data

Dec. 24, 1998 (JP) .................................................. 10-366994
Apr. 30, 1999 (JP) .................................................. 11-124159

(51) Int. Cl.⁷ .......................... G03B 21/56; G03B 21/60; H04N 5/64
(52) U.S. Cl. .......................... 359/457; 359/460; 348/744
(58) Field of Search .................................. 359/443, 453, 359/456, 457, 460; 348/834, 807, 744, 751, 760, 761

(56) References Cited

U.S. PATENT DOCUMENTS 5,400,114 * 3/1995 Yoshida et al. ...................... 359/457
5,615,045   3/1997 Takuma et al. ...................... 359/456
5,675,435 * 10/1997 Ishii et al. ............................ 359/460
5,815,313 * 10/1997 Mitani et al. ........................ 359/448

FOREIGN PATENT DOCUMENTS 0288117      4/1988  (EP) .
0822723 A2  12/1993  (EP) .
WO 98/45753 10/1998  (WO) .

* cited by examiner

Primary Examiner—Christopher E. Mahoney
(74) Attorney, Agent, or Firm—Staas & Halsey LLP

(57) ABSTRACT

A liquid crystal rear-projection TV screen has a double-side lens sheet and horizontal lenticular sheet. A vertical lenticular portion is disposed on the rear side of the double-side lens sheet, and Fresnel lens is disposed on the front side. A horizontal lenticular portion is disposed on the rear side of the horizontal lenticular sheet, and a light-shielding layer and protective resin substrate are disposed on the front side. The resin substrate of the double-side lens sheet has a low transmittance, and the resin substrates of the horizontal lenticular sheet have high transmittances. The observer recognizes an image on the double-side lens sheet arranged behind the light-shielding layer.

20 Claims, 4 Drawing Sheets

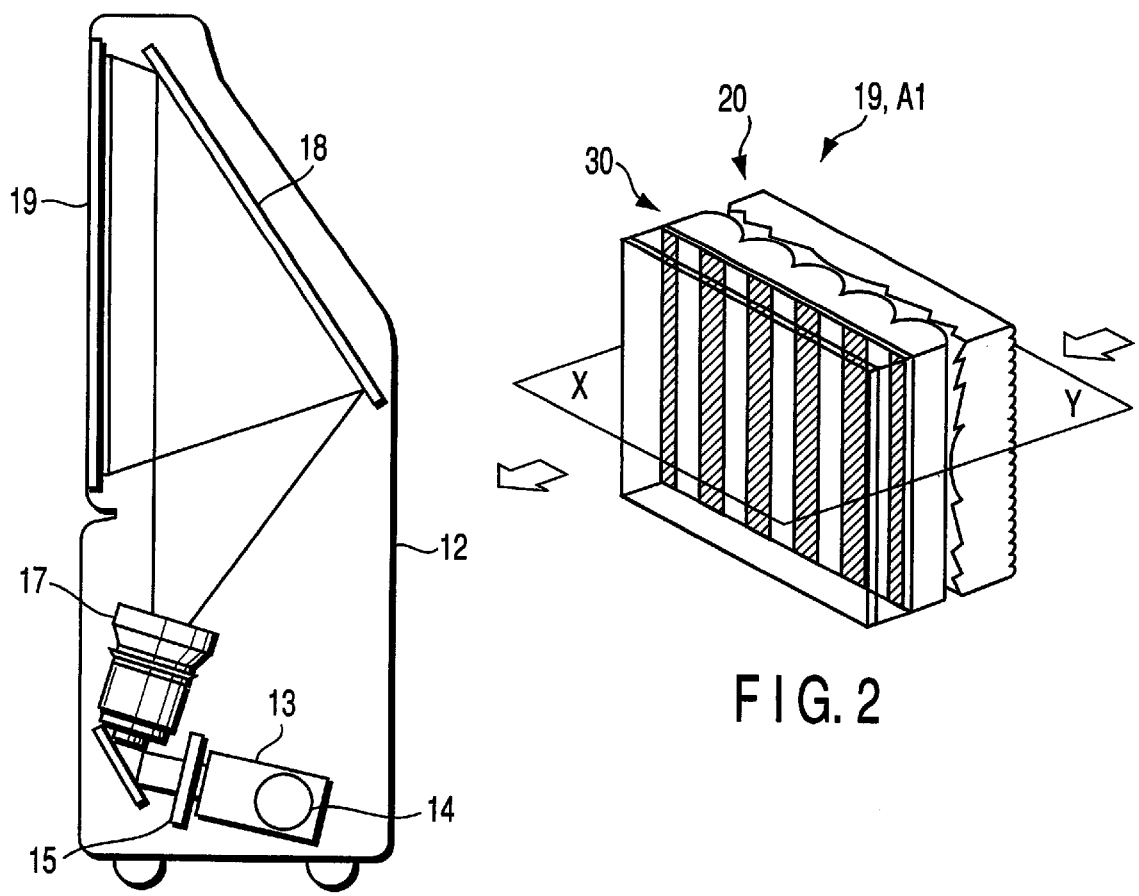
FIG. 1
FIG. 2
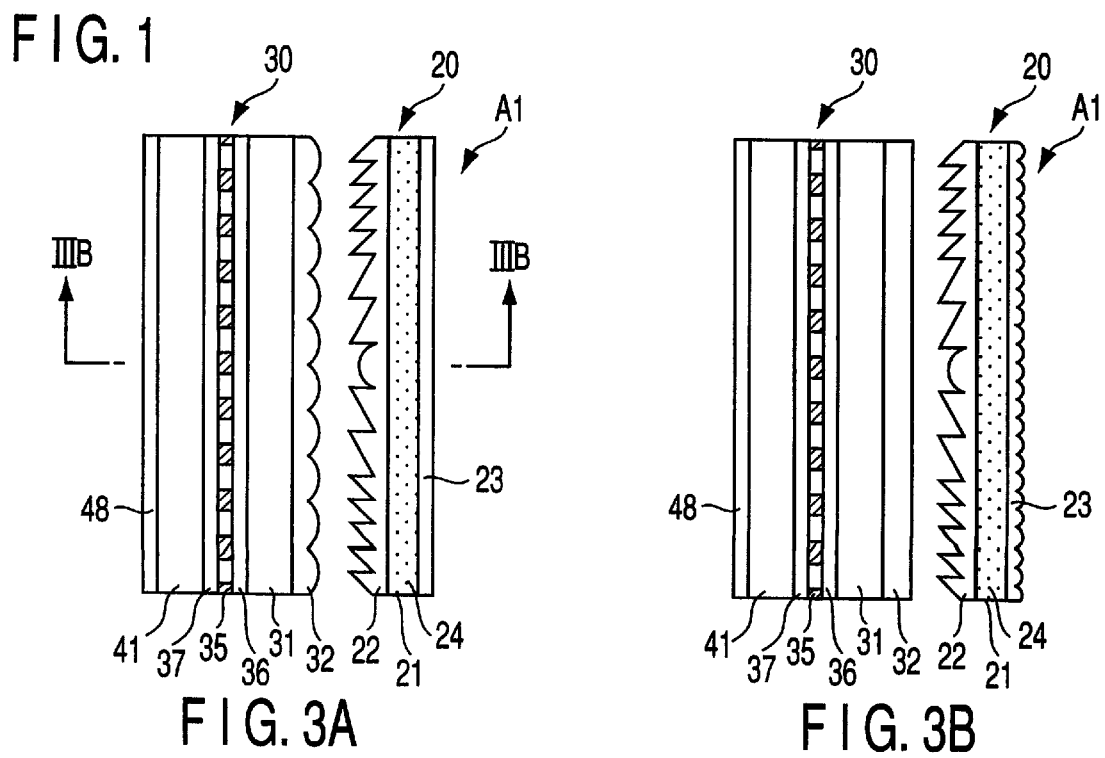
FIG. 3A
FIG. 3B

REAR-PROJECTION SCREEN FOR USE WITH A LIQUID CRYSTAL PANEL AS A VIDEO SOURCE

BACKGROUND OF THE INVENTION

The present invention relates to a rear-projection screen and, more particularly, to a screen used as the display of a rear-projection TV using a liquid crystal panel as a video source.

FIG. 7 is a sectional plan view showing a conventional rear-projection screen generally used for a CRT rear-projection TV. This screen comprises, from the projection side (rear side), a Fresnel lens sheet 110, double-side lenticular sheet 120, and protective plate 130.

The Fresnel lens sheet 110 has a transparent resin substrate 111, and Fresnel lens 112 on its front side. The protective plate 130 has a transparent resin substrate 131 and, normally, a surface-treated layer 138 formed on its front side. The protective plate 130 prevents dust from sticking to the three-dimensional surface of the double-side lenticular sheet 120 on the front side and protects a light-shielding layer 125. The surface-treated layer 138 of the protective plate 130 is formed as an abrasion-resistant hard coat or an antistatic treatment.

The lenticular sheet 120 has a resin substrate 121 and lenticular portions 122 and 123 on both surfaces of the substrate. The lenticular portion 122 on the rear side is constructed by horizontally juxtaposing a plurality of cylindrical lenses extending in the vertical direction. The lenticular portion 122 is provided to refract/diffuse video light in the horizontal direction. The lenticular portion 123 on the observation side (front side) is also constructed by horizontally juxtaposing a plurality of cylindrical lenses extending in the vertical direction. The lenticular portions 122 and 123 have the function of correcting a color shift (to be described later).

A light diffusing material 124 is mixed into the resin substrate 121 of the lenticular sheet 120 to refract/diffuse video light in the vertical direction. The resin substrate 121 has on its front side protruding portions alternating with the cylindrical lenses of the lenticular portion 123. Each protruding portion has a flat top on which a light-shielding layer 125 is formed by printing black ink or the like. The light-shielding layer 125 is provided to improve external light contrast.

Recently, CRT rear-projection TVs are being replaced with liquid crystal rear-projection TVs with characteristic features such as small power consumption, high-image-quality, and lightweight/low-profile structure. In a CRT rear-projection TV, an image is projected from three tubes of R, G, and B, and the positional difference between the three tubes generates a color shift. To correct the color shift, the rear-projection screen must have a double-side lenticular sheet. However, in a liquid crystal rear-projection TV, video light from the liquid crystal is projected through a monocular lens, and no color shift due to the position difference occurs. Hence, the rear-projection screen can use a single-side lenticular sheet.

FIG. 8 is a sectional plan view showing a conventional rear-projection screen used for a liquid crystal rear-projection TV. This screen comprises, from the rear side, a Fresnel lens sheet 140 and horizontal lenticular sheet 150.

The Fresnel lens sheet 140 has a resin substrate 141, and Fresnel lens 142 on its front side. The lenticular sheet 150 has a resin substrate 151, lenticular portion 152 on its rear side, and surface-treated layer 158 on its front side. The lenticular portion 152 is constructed by horizontally juxtaposing a plurality of cylindrical lenses in the vertical direction. The lenticular portion 152 is disposed to refract/diffuse video light in the horizontal directions This screen has no light-shielding layer as shown in FIG. 7, so low contrast due to external light poses a problem. To refract/diffuse video light in the vertical direction and increase the contrast, light diffusing material 154 and dark colorant 154 are mixed into the resin substrate 151 of the lenticular sheet 150. The effect provided is not sufficient, and therefore, a light diffusing material 144 is mixed into the resin substrate 141 of the Fresnel lens sheet 140.

A considerably large amount of light diffusing materials 144 and 154 and dark colorant 154 need be added to obtain a sufficient addition effect. As a result, the screen luminance becomes low in proportion to the content of the added materials. If the content is small, the video light refraction/diffusion function in the vertical direction is insufficient, resulting in a narrow vertical viewing angle of the screen.

FIG. 9 is a sectional plan view showing another example of the conventional rear-projection screen used for a liquid crystal rear-projection TV. This screen comprises, from the rear side, a Fresnel lens sheet 160 and horizontal lenticular sheet 170.

The Fresnel lens sheet 160 has a resin substrate 161, and Fresnel lens 162 on its front side. A light diffusing material 164 is mixed into the resin substrate 161 of the Fresnel lens sheet 160.

The horizontal lenticular sheet 170 has a resin substrate 171, and lenticular portion 172 on its rear side. The lenticular portion 172 on the rear side is constructed by horizontally juxtaposing a plurality of cylindrical lenses extending in the vertical direction. A UV curing resin layer 176 and light-shielding layer 175 are formed on the front side of the resin substrate 171. The light-shielding layer 175 consists of black stripes formed in regions except the light focusing portions of the cylindrical lenses of the lenticular portion 172.

The horizontal lenticular sheet 170 also has a protective resin substrate 181 bonded to the front side of the light-shielding layer 175 via an adhesive layer 177. A light diffusing material 184 and dark colorant 184 are mixed into the resin substrate 181. A surface-treated layer 188 is formed as an anti-reflection treatment, antistatic treatment, and hard coat treatment on the front side of the resin substrate 181.

According to the screen shown in FIG. 9, the contrast is improved, and the content of the above-described colorant or light diffusing material can be reduced because of the effect of the black light-shielding layer 175. In this case, however, a phenomenon called "hot bar" inherent to the liquid crystal rear-projection TV is observed. In the "hot bar" phenomenon, light from the projector light source is observed locally bright, on the screen surface, as a long bar which extends in the horizontal direction perpendicular to the length of the cylindrical lenses of the lenticular portion 172. To solve this phenomenon, light diffusing materials and colorants 164 and 184 are mixed into the resin substrate 161 of the Fresnel lens sheet 160 and the protective resin substrate 181, respectively, to subject them to a light diffusion treatment. For this screen, however, the screen luminance lowers, and the manufacturing cost increases because of preparation of the resin substrates 161 and 181.

BRIEF SUMMARY OF THE INVENTION

It is therefore an object of the present invention to improve both the contrast and luminance of a screen used as the display of a rear-projection TV and also reduce the manufacturing cost.

It is another object of the present invention to increase the viewing angle in an improved screen.

According to the first aspect of the present invention, there is provided a rear-projection screen for which a projection side is defined as a rear side, and an observation side is defined as a front side, comprising:

a first lenticular portion having a plurality of cylindrical lenses extending in a first direction and juxtaposed in a second direction perpendicular to the first direction;

a first substrate disposed on the front side of the first lenticular portion, the first substrate having a thickness of 0.5 to 3 mm, a total light transmittance Tt1 of 75 to 95%, a diffusion transmittance Dt1 of 40 to 70%, and a haze value H1 of 50 to 80;

a Fresnel lens disposed on the front side of the first substrate;

a second lenticular portion disposed on the front side of the Fresnel lens, the second lenticular portion having a plurality of cylindrical lenses extending in the second direction and juxtaposed in the first direction;

a second substrate disposed on the front side of the second lenticular portion, the second substrate having a thickness of 0.05 to 0.3 mm;

a light-shielding stripe layer disposed on the front side of the second substrate, the light-shielding stripe layer having a plurality of light-shielding bands extending in the second direction and juxtaposed in the first direction at an interval; and a third substrate disposed on the front side of the light-shielding stripe layer to come into contact with the light-shielding stripe layer, the third substrate having a thickness of 0.5 to 3 mm, wherein the second and third substrate, when combined, have a total light transmittance Tt2 of 75 to 95%, a diffusion transmittance Dt2 of 0 to 40%, and a haze value H2 of 0 to 50, to satisfy Tt1/Tt2=0.8 to 1.2, Dt1/Dt2≧1, and H1/H2≧1.

According to the second aspect of the present invention, there is provided a liquid crystal rear-projection TV comprising:

a light source;

a liquid crystal panel serving as a video source on which light is projected by the light source;

an optical system for guiding video light obtained by passing the light from the light source through the liquid crystal panel; and the rear-projection screen according to the first aspect, on which the video light is projected by the optical system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic view showing a liquid crystal rear-projection TV;

FIG. 2 is a perspective view showing a rear-projection screen according to an embodiment of the present invention, which is used for the liquid crystal rear-projection TV;

FIG. 3A is a sectional plan view of the screen shown in FIG. 2 taken along a X–Y plane;

FIG. 3B is a sectional side view taken along a line IIIB—IIIB in FIG. 3A;

DETAILED DESCRIPTION OF THE INVENTION

Figure 7:
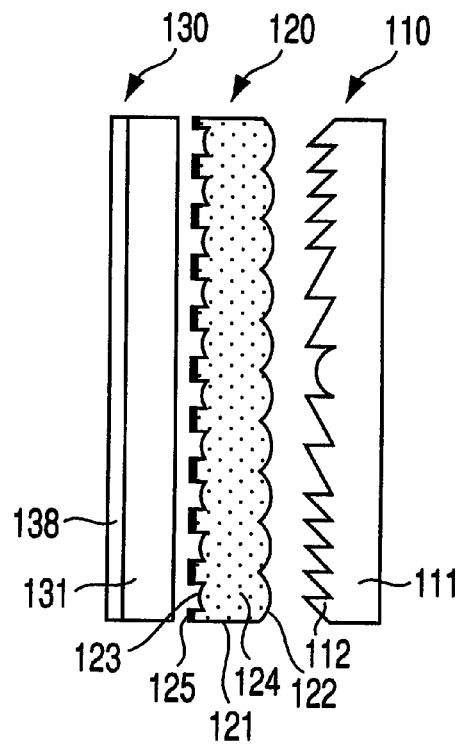
FIG. 7 is a sectional plan view showing a conventional rear-projection screen generally used for a CRT rear-projection TV.
Figure 8:
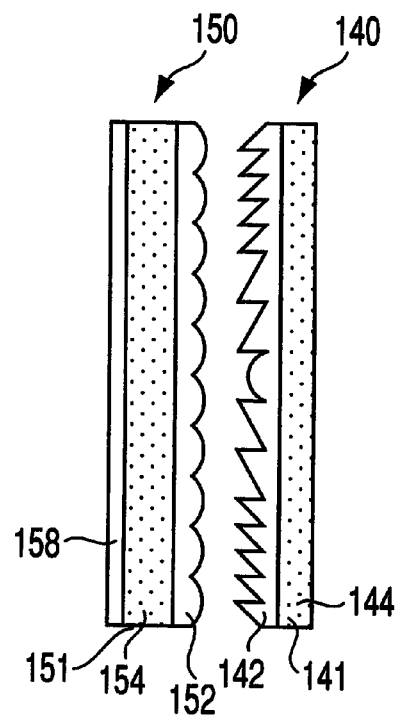
FIG. 8 is a sectional plan view showing a conventional rear-projection screen used for a liquid crystal rear-projection TV.
Figure 9:
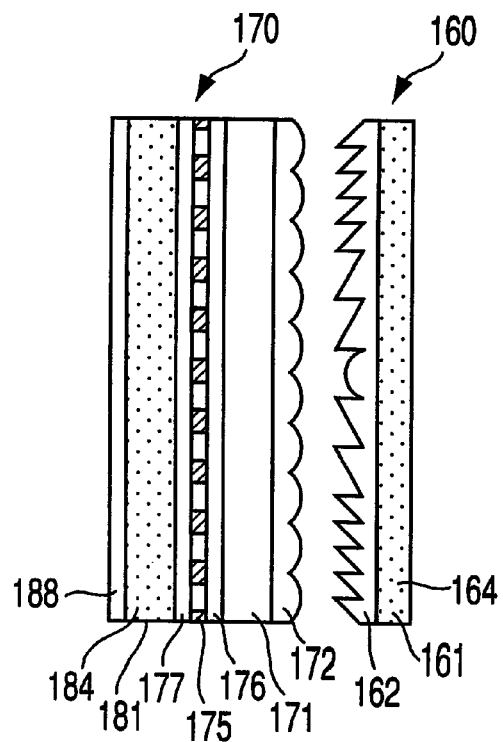
FIG. 9 is a sectional plan view showing another example of the conventional rear-projection screen used for a liquid crystal rear-projection TV.

In the process of development of this invention, the present inventors have made extensive studies on the conventional rear-projection screens as shown in FIGS. 7 to 9 by conducting a number of experiments and consequently obtained the following finding.

Generally, a rear-projection screen having a Fresnel lens sheet on the rear side and a lenticular sheet on the front side, as shown in FIGS. 7 to 9, is arranged such that an observer recognizes an image on the lenticular sheet side. For example, in the screen shown in FIG. 8, the light diffusing material 154 and dark colorant 154 are mixed into the resin substrate 151 of the lenticular sheet 150, and the observer recognizes an image on the resin substrate 151. In the screen shown in FIG. 9, which has the light-shielding stripe layer 175, the light diffusing material 184 and dark colorant 184 are mixed into the protective resin substrate 181 (integrated with the lenticular sheet 170) on the front side of the light-shielding stripe layer, and the observer recognizes an image on the resin substrate 181.

The constitution to cause an observer to recognize an image on the lenticular sheet side is adopted, because, if an amount of light diffusing material is mixed into the Fresnel lens sheet on the rear side, projection light from a projector is excessively diffused, thereby reducing the amount of the parallel component of light outputted to the lenticular sheet by the Fresnel function. The present inventors have found by studies, that the turnabout of conception to cause an observer to recognize an image on the Fresnel lens sheet side can solve the problems of low contrast and light efficiency and high manufacturing cost in the conventional screens.

The embodiments of the present invention based on this finding will be described with reference to the accompanying drawings. In the following description, the same reference numerals denote elements with substantially the same functions and structures, and a detailed description thereof will be made only if necessary.

FIG. 1 is a schematic view showing a liquid crystal rear-projection TV. This TV has a projection driver 13 disposed at the lowermost portion of a casing 12. The projection driver 13 includes a light source 14 and liquid crystal panel 15 used as a video source on its front side. Video light obtained by passing light from the light source 14 through the liquid crystal panel 15 is projected to the rear side of a rear-projection screen 19 of this embodiment through an optical system comprising a projecting lens 17, and mirror 18.

FIG. 2 is a perspective view showing the rear-projection screen according to this embodiment of the present invention, which is used for the liquid crystal rear-projection TV. FIG. 3A is a sectional plan view of the screen shown in FIG. 2 taken along a X–Y plane. FIG. 3B is a sectional side view taken along a line IIIB—IIIB in FIG. 3A. A screen A1 has, from the projection side (rear side), a double-side lens sheet 20 and horizontal lenticular sheet 30.

The double-side lens sheet 20 has a resin substrate 21 having thickness of 0.5 to 3 mm, and for example, 1.5 mm. A light diffusing material 24 is mixed into the resin substrate 21 such that it has a total light transmittance Tt1 of 75 to 95%, and for example, 90%, a diffusion transmittance Dt1 of 40 to 70%, and for example, 60%, and a haze value H1 of 50 to 80, and for example, 70.

Definitions of the total light transmittance, diffusion transmittance, and haze value are based on JIS (Japanese Industrial Standard) K 7105.

A vertical lenticular portion 23 is provided on the rear side of the resin substrate 21. The vertical lenticular portion 23 is constructed by vertically juxtaposing a plurality of substantially transparent cylindrical lenses extending in the horizontal direction at a pitch PLa of 0.2 mm or less, and for example, 0.07 mm. The vertical lenticular portion 23 is arranged to refract/diffuse video light in the vertical direction.

A substantially transparent Fresnel lens 22 is disposed on the observation side (front side) of the resin substrate 21. A pitch Pf of the Fresnel lens 22 is set at 0.05 to 0.2 mm, and for example, 0.1 mm.

The horizontal lenticular sheet 30 has a resin substrate 31 having a thickness of 0.05 to 0.3 mm, and for example, 0.15 mm, and a protective resin substrate 41 bonded thereto and having a thickness of 0.5 to 3 mm, and for example, 2 mm. The resin substrates 31 and 41, when combined, are set to have a total light transmittance Tt2 of 75 to 95%, and for example, 90%, a diffusion transmittance Dt2 of 0 to 40%, and for example, 0%, and a haze value H2 of 0 to 50, and for example, 0. That is, the resin substrates 31 and 41 of this embodiment are substantially transparent.

The set values of the optical characteristics of the resin substrate 21 of the double-side lens sheet 20 and those of the resin substrates 31 and 41 of the horizontal lenticular sheet 30 are set to satisfy Tt1/Tt2=0.8 to 1.2, Dt1/Dt2≧1, and H1/H2≧1.

A horizontal lenticular portion 32 is provided on the rear side of the resin substrate 31. The horizontal lenticular portion 32 is constructed by horizontally juxtaposing a plurality of transparent cylindrical lenses extending in the vertical direction at a pitch PLb of 0.3 mm or less, and for example, 0.15 mm. The horizontal lenticular portion 32 is arranged to refract/diffuse video light in the horizontal direction.

The pitch PLa of the vertical lenticular portion 23 and the pitch PLb of the horizontal lenticular portion 32 satisfy PLa<PLb and, more preferably, PLb/PLa=1.1 to 6.0.

A radiation (e.g., UV) curing region layer 36 and light-shielding layer (stripe layer) 35 are formed on the front side of the resin substrate 31. The light-shielding layer 35 has a plurality of black light-shielding bands extending in the vertical direction and juxtaposed at a certain horizontal interval. The light-shielding bands are formed in the method to be described later in regions except the light focusing portions of the cylindrical lenses of the horizontal lenticular portion 32.

The protective resin substrate 41 is bonded to the front side of the light-shielding layer 35 via an adhesive layer 37. A surface-treated layer 48 having a thickness of 1 to 30 μm, and for example, 5 μm is formed on the front side of the resin substrate 41.

In the rear-projection screen A1 having the above-described structure, the transmittance of the resin substrate 21 of the double-side lens sheet 20 is low, and the transmittances of the resin substrates 31 and 41 of the horizontal lenticular sheet 30 are high. For this reason, the observer recognizes an image on the double-side lens sheet 20 disposed on the rear side of the light-shielding layer 35. This improves contrast by the light-shielding layer 35 of the screen and reduces the external light reflectance. In addition, since only the resin substrate 21 of the double-side lens sheet 20 is used as the diffusion layer, the manufacturing cost of the screen can be reduced.

Furthermore, since the light amount on the screen can be uniformly controlled by the function of Fresnel lens 22, the vertical video light refraction/diffusion function of the vertical lenticular portion 23, and the horizontal video light refraction/diffusion function of the horizontal lenticular portion 32, a uniformly bright screen can be obtained. When the light diffusion characteristics of the resin substrate 21 (diffusion layer) of the double-side lens sheet 20 and the pitch (0.2 mm or less) of the vertical lenticular portion 23 are controlled, hot bar inherent to the liquid crystal rear-projection screen can be easily eliminated. The vertical viewing angle can also be controlled.

Figures 4A, 4B:
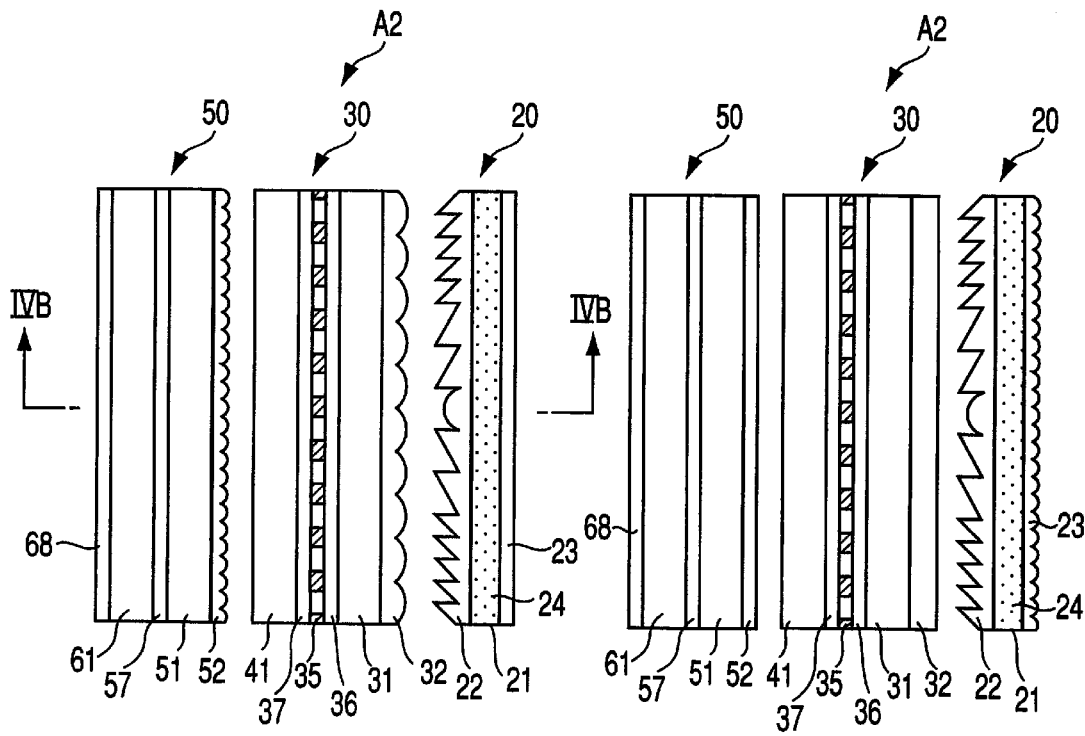
FIG. 4A is a sectional plan view showing a rear-projection screen according to another embodiment of the present invention, which is used for a liquid crystal rear-projection TV.
FIG. 4B is a sectional side view taken along a line IVB—IVB in FIG. 4A.
Figure 6:
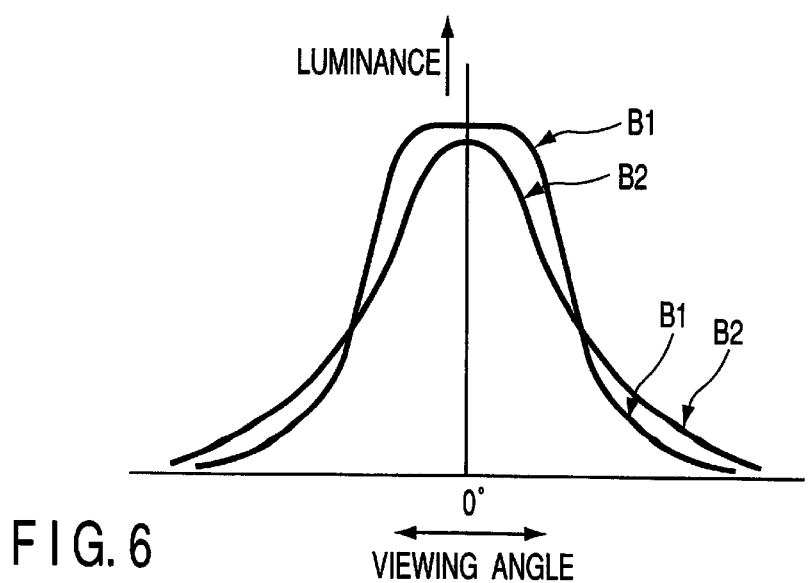
FIG. 6 is a graph showing the relationship between the viewing angle and luminance of the screen.

FIG. 4A is a sectional plan view showing a rear-projection screen according to another embodiment of the present invention, which is used for a liquid crystal rear-projection TV. FIG. 4B is a sectional side view taken along a line IVB—IVB in FIG. 4A. A screen A2 has, from the projection side (rear side), a double-side lens sheet 20, first horizontal lenticular sheet 30, and second horizontal lenticular sheet 50.

The double-side lens sheet 20 and first horizontal lenticular sheet 30 have the same compositions and structures as those of the double-side lens sheet 20 and horizontal lenticular sheet 30 shown in FIGS. 2, 3A, and 3B, except that the surface-treated layer 48 on the surface of the protective resin substrate 41 is omitted.

The second horizontal lenticular sheet 50 has a resin substrate 51 having a thickness of 0.05 to 0.3 mm, and for example, 0.2 mm, and a protective resin substrate 61 bonded thereto and having a thickness of 0.5 to 3 mm, and for example, 2 mm. The resin substrates 51 and 61, when combined, are set to have a total light transmittance Tt3 of 75 to 95%, and for example, 90%, a diffusion transmittance Dt3 of 0 to 40%, and for example, 0%, and a haze value H3 of 0 to 50, and for example, 0. That is, the resin substrates 51 and 61 of this embodiment are substantially transparent.

The set values of the optical characteristics of the resin substrate 21 of the double-side lens sheet 20 and those of the resin substrates 51 and 61 of the second horizontal lenticular sheet 50 are set to satisfy Tt1/Tt3=0.8 to 1.2, Dt1/Dt3≧1, and H1/H3≧1.

A horizontal lenticular portion 52 is provided on the rear side of the resin substrate 51. The horizontal lenticular portion 52 is constructed by horizontally juxtaposing a plurality of transparent cylindrical lenses extending in the vertical direction at a pitch PLc of 0.1 mm or less, and for example, 0.05 mm. The horizontal lenticular portion 52 is arranged to refract/diffuse video light in the horizontal direction.

A pitch PLb of a horizontal lenticular portion 32 of the first horizontal lenticular sheet 30 and the pitch PLc of the horizontal lenticular portion 52 of the second horizontal lenticular sheet 50 satisfy PLc<PLb and, more preferably, PLb/PLc=1.1 to 6.0.

The protective resin substrate 61 is bonded to the front side of the resin substrate 51 via an adhesive layer 57. A surface-treated layer 68 having a thickness of 1 to 30 μm, and for example, 5 μm is formed on the front side of the resin substrate 61.

In the rear-projection screen A2 having the above-described structure, since the second horizontal lenticular sheet 50 is arranged on the front side of the first horizontal lenticular sheet 30, the viewing angle in the horizontal direction increases. More specifically, without the second horizontal lenticular sheet 50, when the viewing angle is large, the luminance abruptly decreases from a certain viewing angle. When the second horizontal lenticular sheet 50 is provided, the luminance moderately decreases as the viewing angle becomes large. This means that for the screen having the second horizontal lenticular sheet 50, the observer senses no incompatibility because the luminance gradually decreases from a certain viewing angle.

Materials used to form the above two screens A1 and A2 will be described next.

As the main material of the resin substrate 21 of the double-side lens sheet 20, polyester resin, styrene resin, acrylic resin, acrylic-styrene copolymer resin, polycarbonate resin, or the like can be used. However, the main material of the resin substrate 21 is not particularly limited, and it is important to finally obtain the above-described optical characteristics.

The light diffusing material 24 to be mixed into the resin substrate 21 comprises spherical beads of an inorganic compound such as $SiO_2$ (glass) or an organic compound such as acrylic resin. The grain size of the beads is set at 3 to 100 μm. The light diffusing material 24 having this shape has an effect to be described below.

Transmitted light (La) obtained by passing projected light from the projector through the resin substrate 21 (diffusion layer) of the double-side lens sheet 20 is represented by the sum of parallel light (L1) and diffused light (L2). The transmitted light is incident on the lens surface of the first horizontal lenticular sheet 30 and emerges to the observation side.

For the diffusion layer of the conventional rear-projection screen, a formless material such as an inorganic fine powder of glass, titanium oxide, calcium carbonate, silicon dioxide (silica), aluminum oxide, or various types of clays is used as a light diffusing material. If only such light diffusing material is used in the resin substrate 21 of the double-side lens sheet 20, light transmitted through the resin substrate 21 has a formation such that part of parallel light (L1) components has changed into diffused light (L2) components, when the light passes through the light focusing portions of the horizontal lenticular sheet 30, i.e., screen openings of the light-shielding layer 35. In this case, the light is eclipsed by the light-shielding layer 35 (when the BS ratio is 50% or more) (the eclipse ratio is 20% to 30%), resulting in loss in amount of transmitted light.

The light diffusing material in the resin substrate 21 (diffusion layer) of the double-side lens sheet 20 of the present invention contains spherical beads of an inorganic compound such as $SiO_2$ (glass) or an organic compound such as acrylic resin, and each bead has a grain size of 3 to 100 μm. For this reason, the light transmitted through the resin substrate 21 contains parallel light (L1) components in a larger amount than that of diffused light (L2) components when the light passes through the light focusing portions of the horizontal lenticular sheet 30, i.e., screen openings of the light-shielding layer 35. In this case, the light eclipse ratio by the light-shielding layer 35 (when the BS ratio is 50% or more) becomes low (the eclipse ratio is 10% or less). The loss in amount of transmitted light decreases, and therefore, the luminance of screen increases.

As needed, in addition to the beads, an inorganic fine powder of glass, glass fiber, titanium oxide, calcium carbonate, silicon dioxide (silica), aluminum oxide, or various types of clays, or fine particles of a cross-linked polymer resin can be added to the resin substrate 21 of the double-side lens sheet 20, which contains the light diffusing material 24.

A colorant and antistatic agent can also be added to the resin substrate 21. The colorant contains one of a black visible light absorption material whose light absorption spectrum is almost uniform in the visible wavelength range and a visible light absorption material having selective wavelength characteristics. This increases the light absorption amount in the visible light wavelength range and the external light contrast. Examples of the colorant capable of absorbing visible light are dyes, pigments, carbon, and metallic salt compatible with the resin substrate 21. The antistatic agent is not particularly limited and can be incorporated and mixed into the resin substrate 21 when molding it.

The main material of the resin substrates 31 and 51 of the horizontal lenticular sheets 30 and 50 is not particularly limited, and polyester resin, polystyrene resin, acrylic resin, acrylic-styrene copolymer resin, polycarbonate resin, or the like can be used. However, the main material of the resin substrates 31 and 51 is not particularly limited, and it is important to finally obtain the above-described optical characteristics.

The main material of the protective resin substrates 41 and 61 is not particularly limited, and a material having high rigidity and light transmittance, e.g., styrene resin, acrylic resin, acrylic-styrene copolymer resin (MS resin), or polycarbonate resin can be used. However, the main material of the resin substrates 41 and 61 is not particularly limited, and it is important to finally obtain the above-described optical characteristics. The main material of the resin substrates 41 and 61 must apply rigidity to the horizontal lenticular sheets 30 and 50. The resin substrate 41 must appropriately protect the light-shielding layer 35. A colorant can be mixed into the resin substrates 41 and 61 as needed within the range of conditions of the above-described optical characteristics.

The surface-treated layers 48 and 68 of the resin substrates 41 and 61 are formed as a hard coat treatment, antistatic treatment, and anti-reflection treatment. The outermost surface of the resin substrate 41 or 61 serves the observation surface of the rear-projection screen. For this reason, the hard coat treatment is used to make the surface resistant against flaws due to external scratching or contact. In addition, the antistatic treatment is used to prevent dust from sticking to the outermost surface of the resin substrate 41 or 61 and reduce the frequency of wiping the screen surface. Furthermore, the anti-reflection treatment is used to reduce reflection on the screen surface, reflection of external light, and video disturbance due to reflected external light.

The hard coat layer by the hard coat treatment can be formed from a UV curing coating. A UV curing coating generally contains, as principal component, a polymer, oligomer, or monomer having an epoxy group or a double bond of radical polymerization as a film formation component, and also contains a photopolymerization initiator or sensitizer. When a polyacrylate-(metaacrylate-)based UV curing coating whose film formation component has an acrylate-based functional group is used, a hard coat layer excellent in surface hardness, transparency, abrasion resistance, and scuffing resistance can be formed.

To apply a UV curing coating to a resin plate, an arbitrary application method such as blade coating, rod coating, knife coating, reverse roll coating, spray coating, or offset gravure coating can be used. Especially, gravure coating, gravure reverse coating, reverse roll coating, offset gravure coating, or curtain flow coating is suitable because of the high accuracy of coating thickness and flatness of the coat surface. Alternatively, the hard coat layer may be used by transfer using a transfer sheet having the hard coat layer as a transfer layer.

The antistatic treatment is performed by applying an antistatic agent to the resin substrate 41 or 61. For example, tin oxide ($SnO_2$) having a grain size of 0.5 $\mu$m or less is used to form an antistatic layer having a surface resistance value of $10^{12}\Omega$ or less. The fine metal oxide powder is not particularly limited to this as far as the surface resistance value of the antistatic layer is $10^{12}\Omega$ or less. Especially, the type and content of the antistatic agent are not limited.

The anti-reflection treatment can be realized by an anti-glare treatment (AG) using a matte layer by forming a three-dimensional pattern on the observation layer surface or a low-reflection treatment (LR, AL) by stacking layers of materials having different refractive indices on the protective plate by coating or laminating. The material having a low refractive index and formation method are not particularly limited. With this treatment, an image with improved external light contrast and without any reflection of external light can be obtained.

More specifically, the hard coat treatment can be used to make the outermost layer of the protective resin substrate 41 or 61 resistant against external scratching or flaws. The hard coat layer is formed from a UV curing coating such as an acrylic UV curing coating. When an inorganic compound such as $SiO_2$ (glass) or an organic compound such as acrylic resin is added to the resin at a ratio of 50% or less to form a matte layer having a three-dimensional surface, the anti-glare (AG) treatment can be performed.

The hard coat layer, i.e., coating containing such additives functions as a light diffusion layer for increasing the viewing angle of the screen. For the screen A1 without the second horizontal lenticular sheet 50 for improving the viewing angle, it is important to perform a treatment for the substantially transparent protective resin substrate 41 to increase the viewing angle of the screen. For this reason, the surface-treated layer 48 as thin as 1 to 30 $\mu$m, which is formed on the observation surface of the substrate 41, preferably has the function of a light diffusion layer.

When layers having different refractive indices are stacked on the hard coat layer as a low-reflection layer, the low-reflection (LR) treatment can be performed. When an AR film formed by stacking layers of Ti, $SiO_2$, and the like, which have different refractive indices, is formed on the hard coat layer as an anti-reflection layer, the anti-reflection (AR) treatment can be performed.

The vertical lenticular portion 23 and Fresnel lens 22 of the double-side lens sheet 20 and the horizontal lenticular portions 32 and 52 of the horizontal lenticular sheets 30 and 50 can be formed by one of the following methods 1 to 3. A sheet-shaped substrate to be mentioned in the description below can be formed from a resin material such as polystyrene resin, acrylic resin, or polycarbonate resin.

Method 1: A sheet-shaped substrate is heated and embossed using a mold in a hot melt state by flat pressing.

Method 2: Using melt extrusion molding by an extruder, the surface of a sheet-shaped substrate extruded in a melt state is embossed using an emboss roll mold.

Method 3: A UV or electron beam curing resin composition is applied to the molding surface of an emboss roll mold, and a sheet-shaped substrate is supplied to the emboss roll mold. The resin is irradiated with UV rays or ionization radiation through the substrate to cure the resin. Simultaneously, a lens formed from the resin molded product is stacked and bonded to a transparent substrate.

Although the method to be used is not particularly limited, method 3 using an UV or electron beam curing resin is practical from the viewpoint of productivity, where the Fresnel lens 22 of the double-side lens sheet 20 and the horizontal lenticular portions 32 and 52 of the horizontal lenticular sheets 30 and 50 are formed. Furthermore, although the method to be used is not particularly limited, method 2 using the extrusion molding is practical, where the vertical lenticular portion 23 of the double-side lens sheet 20 is formed.

As described above, the light-shielding layer 35 of the horizontal lenticular sheet 30 is formed from black light-absorbing/light-shielding stripes formed in regions except the light focusing portions of the cylindrical lenses of the horizontal lenticular portion 32. That is, the light-shielding stripes are formed in regions where video light focused by the horizontal lenticular portion 32 does not pass.

FIGS. 5A to 5E are sectional plan views showing the steps in forming the light-shielding layer 35.

Figure 5A:
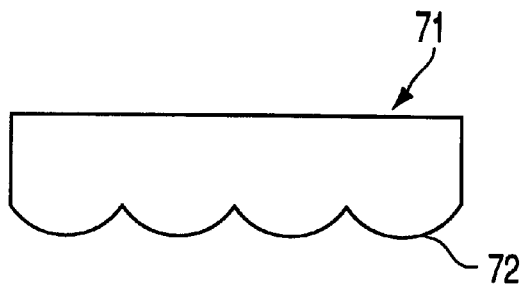
FIGS. 5A to 5E are sectional plan views showing the steps in forming the light-shielding layer of the screen shown in FIGS. 3A and 3B or 4A and 4B.

First, as shown in FIG. 5A, a substrate 71 having a lenticular portion 72 of cylindrical lenses on one surface is prepared.

Figure 5B:
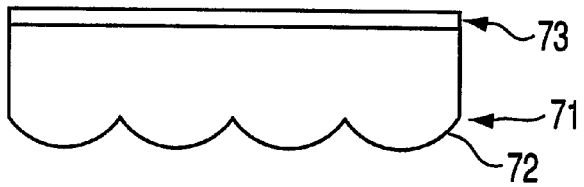

Next, as shown in FIG. 5B, an ionization radiation curing resin layer 73 is formed on the flat surface of the substrate 71.

Figure 5C:
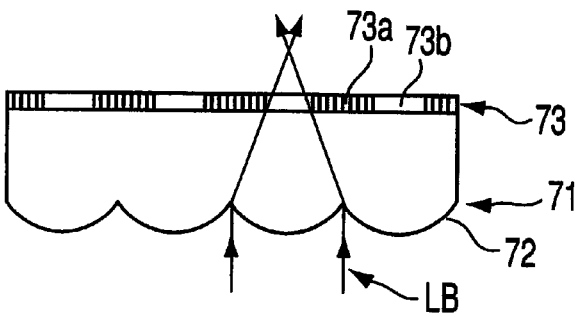

As shown in FIG. 5C, the flat surface of the substrate 71 is vertically irradiated from the lenticular portion 72 side with a band-shaped light beam LB extending in the longitudinal direction of the cylindrical lenses. At this time, the light source and substrate 71 are moved relative to each other in the juxtaposing direction of the cylindrical lenses. With this process, the resin layer 73 is cured in correspondence with the position of light focused by each cylindrical lens. Uncured layers 73a and cured layers 73b are formed in the resin layer 73.

Figure 5D:
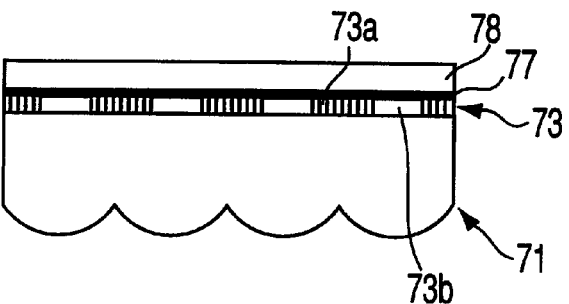

As show in FIG. 5D, a transfer sheet 78 formed by forming a black coloring layer 77 on a transfer sheet substrate 76 is overlaid on the entire flat surface of the substrate 71 having the resin layer 73 such that the coloring layer 77 side opposes the substrate 71. Using the adhesion of the uncured layers 73a, the coloring layer 77 is caused to stick to only the uncured layers 73a. Instead, a fine black toner powder may be caused to selectively stick to only the uncured layers 73a.

Figure 5E:
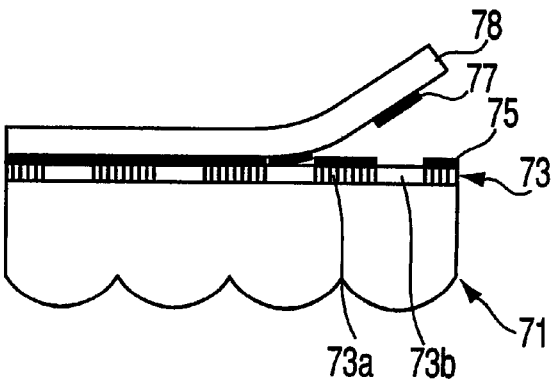

Next, as shown in FIG. 5E, the transfer sheet 78 is peeled from the substrate 71 to remove the coloring layer 77 portions corresponding to the cured layers 73b. With this process, a light-shielding layer 75 consisting of bands or stripes is formed in correspondence with the uncured layers 73a.

In the exposure process shown in FIG. 5C, when the light source and substrate 71 are moved relative to each other in the juxtaposing direction of the cylindrical lenses, the same irradiation state as that when the entire surface of the lenticular portion 72 is irradiated with parallel light beams at once is obtained. Hence, the light-shielding layers 75 are formed in correspondence with the light nonfocusing portions of the lenticular sheet in actual use. More specifically, the light-shielding layers 75 can be self-aligned at portions where video light does not pass, i.e., portions where light shielding is required, at an appropriate positional accuracy.

According to this exposure process, when the width of the uncured layer 73a is controlled in accordance with the exposure amount, the width of each band of the light-shielding layer 75 can be controlled. The ratio of the width of the nonfocusing portion and that of the (nonfocusing portion+focusing portion) is defined as a BS ratio. To obtain sufficient contrast, the BS ratio is preferably 50% or more.

[Experiments]

The performances of samples PS1 and PS2 of the rear-projection screens A1 and A2 for a liquid crystal rear-projection TV according to the present invention shown in FIGS. 2 to 4, samples CS1 and CS2 of the conventional rear-projection screens for a liquid crystal rear-projection TV shown in FIGS. 8 and 9, and a sample CS3 of the conventional rear-projection screen for the CRT rear-projection TV shown in FIG. 7 were compared.

Structure of Sample

1. Sample PS1 According to the Present Invention

The sample PS1 was formed from a double-side lens sheet 20 and horizontal lenticular sheet 30 having the black light-shielding layer 35, as shown in FIGS. 3A and 3B. For specifically, the light diffusing material 24 was mixed into a resin substrate 21 of the double-side lens sheet 20. Resin substrates 31 and 41 of the horizontal lenticular sheet 30 were substantially transparent. The surface-treated layer 48 of the protective resin substrate 41 was omitted. The pitches Pf, PLa, and PLb of Fresnel lens 22, vertical lenticular portion 23, and horizontal lenticular portion 32 were set at 0.1 mm, 0.07 mm, and 0.16 mm, respectively.

2. Sample PS2 According to the Present Invention

The sample PS2 was formed from a double-side lens sheet 20, first horizontal lenticular sheet 30 having a black light-shielding layer 35, and second horizontal lenticular sheet 50, as shown in FIGS. 4A and 4B. More specifically, the sample PS2 was formed by adding the second horizontal lenticular sheet 50 on the front side of the sample PS1. A surface-treated layer 68 of a protective resin substrate 61 was omitted. The PLc of a horizontal lenticular portion 52 was set at 0.07 mm.

3. Comparative Sample CS1

The sample CS1 was formed from a Fresnel lens sheet 140 and horizontal lenticular sheet 150 having no black light-shielding layer, as shown in FIG. 8. More specifically, a light diffusing material 144 was mixed into a resin substrate 141 of the Fresnel lens sheet 140, and a light diffusing material and colorant 154 were mixed into a resin substrate 151 of the horizontal lenticular sheet 150. The surface-treated layer 158 of the resin substrate 151 was omitted. The pitches of the cylindrical lenses and horizontal lenticular portion were set to be the same as those of the sample PS1 according to the present invention.

4. Comparative Sample CS2

The sample CS2 was formed from a Fresnel lens sheet 160 and horizontal lenticular sheet 170 having a black light-shielding layer 175. More specifically, a light diffusing material 164 was mixed into a resin substrate 161 of the Fresnel lens sheet 160, and a light diffusing material and colorant 184 were mixed into a protective resin substrate 181 of the horizontal lenticular sheet 170. A surface-treated layer 188 of the protective resin substrate 181 was omitted. The pitches of the cylindrical lenses and horizontal lenticular portion were set to be the same as those of the sample PS1 according to the present invention.

5. Comparative Sample CS3

As the sample CS3, a commercially available CRT rear-projection TV screen having the structure shown in FIG. 7 was used. More specifically, the sample CS3 had a Fresnel lens sheet 110, double-side lenticular sheet 120, and protective plate 130. A light diffusing material 124 was mixed into a resin substrate 121 of the double-side lenticular sheet 120. The pitch of the Fresnel lens 112 was 0.15 mm, and that of a horizontal lenticular portion 122 was 0.5 mm.

Evaluation Method

The optical characteristics of the above samples were evaluated by the following method.

1. Viewing Angle

Each sample of the rear-projection screen was set in a liquid crystal rear-projection TV (illuminance at the screen central portion: 200 LUX). At a position separated from the screen by 2 m, the luminance ($cd/m^2$) at the screen central portion and the luminances at positions separated from the central portion in the horizontal direction by predetermined angles were measured. Measurement was performed in a 2°-viewing field using a BM-7 available from Topcon. On the basis of the measurement result, the angles at which the central luminance became ½, ⅓, 1/10, and 1/20 were represented by αH, βH, γH, and δH, respectively. The luminance ($cd/m^2$) at the screen central portion and the luminances at positions separated from the central portion in the vertical direction by predetermined angles were measured. Measurement was performed in a 2°-viewing field using the BM-7 available from Topcon. On the basis of the measurement result, the angle at which the central luminance became ½ was represented by αV.

2. Luminance

Each sample of the rear-projection screen was set in a liquid crystal rear-projection TV (illuminance at the screen central portion: 200 LUX). The luminance at a position separated from the screen by 2 m was measured. Measurement was performed in a 2°-viewing field using the BM-7 available from Topcon.

3. Contrast

Each sample of the rear-projection screen was set in a liquid crystal rear-projection TV (luminance at the screen central portion: 200 LUX). At a position separated from the screen by 2 m, the luminances ($cd/m^2$) of the white and black portions were measured, and contrast was obtained from the luminance ratio. Measurement was performed in a 2°-viewing field using the BM-7 available from Topcon.

4. External Light Reflectance

Each sample of the rear-projection screen was set in a liquid crystal rear-projection TV (luminance at the screen central portion: 200 LUX). At a position separated from the screen by 2 m, the black luminance is measured, and external light reflectance was obtained from the luminance ratio relative to a reference white board.

5. Hot Bar

Each sample of the rear-projection screen was set in a liquid crystal rear-projection TV (luminance at the screen central portion: 200 LUX). A sample for which a see-through phenomenon (the light source was seen through) was not observed was represented by "⊚", a sample for which the phenomenon was slightly observed was represented by "Δ", and a sample for which the phenomenon was observed was represented by "X".

6. Moire and Sharpness

A projected image was visually observed. A sample for which moire was rarely observed was represented by "⊚", and a sample for which moire was slightly observed was represented by "Δ". Sharpness represents the resolution of the image. A projected image was evaluated by visual observation. A sample excellent in resolution was represented by "⊚", and a sample slightly poor in resolution was represented by "Δ".

Table 1 shows the result of this experiment. As shown in Table 1, the samples PS1 and PS2 are more 5 excellent on the general base than the remaining samples in the luminance, contrast, external light reflectance, and hot bar. In addition, the sample PS2 is more excellent in viewing angle characteristics than the sample PS1.

TABLE 1

| Optical characteristic | PS1 | PS2 | CS1 | CS2 | CS3 |
|---|---|---|---|---|---|
| Viewing angle (°) | | | | | |
| Horizontal direction α H | 35 | 37 | 35 | 35 | 30 |
| Horizontal direction β H | 40 | 42 | 41 | 41 | 38 |
| Horizontal direction γ H | 45 | 48 | 46 | 46 | 43 |
| Horizontal direction δ H | 50 | 55 | 51 | 51 | 48 |
| Vertical direction α V | 8 | 8 | 8 | 8 | 10 |
| Luminance (cd/cm2) | 460 | 430 | 130 | 380 | 190 |
| Contrast | 150 | | 40 | 100 | 45 |
| External light contrast (%) | 1.5 | | 4 | 3 | 4 |
| Hot bar | ⊚ | X | ○ | ○ | |
| Moire | ⊚ | ⊚ | ⊚ | ⊚ | Δ |
| Sharpness | ⊚ | ○ | ⊚ | Δ | |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rear-projection screen for which a projection side is defined as a rear side, and an observation side is defined as a front side, comprising:

a first lenticular portion having a plurality of cylindrical lenses extending in a first direction and juxtaposed in a second direction perpendicular to the first direction;

a first substrate disposed on the front side of said first lenticular portion, said first substrate having a thickness of 0.5 to 3 mm, a total light transmittance Tt1 of 75 to 95%, a diffusion transmittance Dt1 of 40 to 70%, and a haze value H1 of 50 to 80;

a Fresnel lens disposed on the front side of said first substrate;

a second lenticular portion disposed on the front side of said Fresnel lens, said second lenticular portion having a plurality of cylindrical lenses extending in the second direction and juxtaposed in the first direction;

a second substrate disposed on the front side of said second lenticular portion, said second substrate having a thickness of 0.05 to 0.3 mm;

a light-shielding stripe layer disposed on the front side of said second substrate, said light-shielding stripe layer having a plurality of light-shielding bands extending in the second direction and juxtaposed in the first direction at an interval; and a third substrate disposed on the front side of said light-shielding stripe layer to come into contact with said light-shielding stripe layer, said third substrate having a thickness of 0.5 to 3 mm, wherein said second and third substrate, when combined, have a total light transmittance Tt2 of 75 to 95%, a diffusion transmittance Dt2 of 0 to 40%, and a haze value H2 of 0 to 50, to satisfy Tt1/Tt2=0.8 to 1.2, Dt1/Dt2≧1, and H1/H2≧1.

2. The screen according to claim 1, wherein said first lenticular portion, said first substrate, and said Fresnel lens construct an integrated first lens sheet.

3. The screen according to claim 1, wherein said second lenticular portion, said second substrate, said light-shielding stripe layer, and said third substrate construct an integrated second lens sheet.

4. The screen according to claim 1, wherein each of said first, second, and third substrates is substantially formed from a resin substrate.

5. The screen according to claim 1, wherein said cylindrical lenses of said second lenticular portion are arrayed at a pitch of not more than 0.3 mm.

6. The screen according to claim 5, wherein said cylindrical lenses of said first lenticular portion are arrayed at a pitch of not more than 0.2 mm.

7. The screen according to claim 6, wherein when the pitch of said cylindrical lenses of said first lenticular portion is PLa, and the pitch of said cylindrical lenses of said second lenticular portion is PLb, PLa<PLb is satisfied.

8. The screen according to claim 7, wherein PLb/PLa=1.1 to 6.0 is satisfied.

9. The screen according to claim 1, wherein said bands of said light-shielding stripe layer are arranged at positions corresponding to nonfocusing portions of said cylindrical lenses of said second lenticular portion.

10. The screen according to claim 1, wherein said first substrate is substantially formed from a resin material in which a light diffusing material is mixed.

11. The screen according to claim 10, wherein the light diffusing material comprises beads of an inorganic or organic compound.

12. The screen according to claim 10, wherein a colorant and an antistatic agent are further mixed into the resin material of said first substrate.

13. The screen according to claim 1, further comprising a light diffusion layer having a thickness of 1 to 30 μm and formed on a front-side surface of said third substrate.

14. The screen according to claim 13, wherein said light diffusion layer substantially comprises a resin layer in which an inorganic or organic compound is mixed at a ratio of not more than 50%.

15. The screen according to claim 1, further comprising a coating applied to the a front-side surface of said third substrate and having a function selected from the group consisting of hard coat, antistatic, and anti-reflection functions.

16. The screen according to claim 1, further comprising a third lenticular portion disposed on the front side of said third substrate.

17. The screen according to claim 16, wherein said third lenticular portion has a plurality of cylindrical lenses extending in the second direction and juxtaposed in the first direction.

18. The screen according to claim 17, wherein when a pitch of said cylindrical lenses of said second lenticular portion is PLb, and a pitch of said cylindrical lenses of said third lenticular portion is PLc, PLc<PLb is satisfied.

19. The screen according to claim 18, wherein PLb/PLa= 1.1 to 6.0 is satisfied.

20. A liquid crystal rear-projection TV comprising:
   a light source;
   a liquid crystal panel serving as a video source on which light is projected by said light source;
   an optical system for guiding video light obtained by passing the light from said light source through said liquid crystal panel; and
   a rear-projection screen for which a projection side is defined as a rear side, and an observation side is defined as a front side, said rear-projection screen including
      a first lenticular portion having a plurality of cylindrical lenses extending in a first direction and juxtaposed in a second direction perpendicular to the first direction;
      a first substrate disposed on the front side of said first lenticular portion, said first substrate having a thickness of 0.5 to 3 mm, a total light transmittance Tt1 of 75 to 95%, a diffusion transmittance Dt1 of 40 to 70%, and a haze value H1 of 50 to 80;
      a Fresnel lens disposed on the front side of said first substrate;
      a second lenticular portion disposed on the front side of said Fresnel lens, said second lenticular portion having a plurality of cylindrical lenses extending in the second direction and juxtaposed in the first direction;
      a second substrate disposed on the front side of said second lenticular portion, said second substrate having a thickness of 0.05 to 0.3 mm;
      a light-shielding stripe layer disposed on the front side of said second substrate, said light-shielding stripe layer having a plurality of light-shielding bands extending in the second direction and juxtaposed in the first direction at an interval; and
      a third substrate disposed on the front side of said light-shielding stripe layer to come into contact with said light-shielding stripe layer, said third substrate having a thickness of 0.5 to 3 mm, wherein said second and third substrate, when combined, have a total light transmittance Tt2 of 75 to 95%, a diffusion transmittance Dt2 of 0 to 40%, and a haze value H2 of 0 to 50, to satisfy Tt1/Tt2=0.8 to 1.2, Dt1/Dt2 1, and H1/H2 1, wherein
   the video light is projected by said optical system onto said rear-projection screen.

* * * * *